US012206827B2

(12) United States Patent
Nishimura

(10) Patent No.: US 12,206,827 B2
(45) Date of Patent: Jan. 21, 2025

(54) IMAGE FORMING APPARATUS AND IMAGE FORMING METHOD

(71) Applicant: SHARP KABUSHIKI KAISHA, Sakai (JP)

(72) Inventor: Michiaki Nishimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/381,318

(22) Filed: Oct. 18, 2023

(65) Prior Publication Data

US 2024/0146856 A1 May 2, 2024

(30) Foreign Application Priority Data

Oct. 31, 2022 (JP) .................. 2022-174627

(51) Int. Cl.
*H04N 1/23* (2006.01)
*H04N 1/00* (2006.01)

(52) U.S. Cl.
CPC ....... *H04N 1/2338* (2013.01); *H04N 1/00809* (2013.01); *H04N 1/00816* (2013.01)

(58) Field of Classification Search
None
See application file for complete search history.

(56) References Cited

U.S. PATENT DOCUMENTS

| 2012/0038943 A1* | 2/2012 | Hakamada | ......... H04N 1/00708 |
| | | | 358/1.13 |
| 2016/0070219 A1* | 3/2016 | Ono | ....................... G03G 15/50 |
| | | | 399/86 |
| 2019/0327375 A1* | 10/2019 | Baba | .................. H04N 1/00708 |

FOREIGN PATENT DOCUMENTS

JP 2008-236486 A 10/2008

* cited by examiner

*Primary Examiner* — Lennin R Rodriguezgonzalez
(74) *Attorney, Agent, or Firm* — ScienBiziP, P.C.

(57) ABSTRACT

An image forming apparatus includes one or more controllers that control reading of a plurality of documents, an image processing, a printing, and a post-processing, wherein in a case where the post-processing is set, and when a main scanning direction size is alignable to a main scanning direction size of one of the documents by applying, to an image of each document, at least one of image processing among rotation in the unit of 90 degrees, enlargement/reduction, and margin increase/decrease adjustment, the controller allows to perform the post-processing by aligning the main scanning direction size of each image with respect to the alignable size as a reference size.

6 Claims, 11 Drawing Sheets

IMAGE FORMING APPARATUS AND IMAGE FORMING METHOD

CROSS-REFERENCE TO RELATED APPLICATION

The present application claims priority from Japanese Application JP 2022-174627, the content of which is hereby incorporated by reference into this application.

BACKGROUND OF THE INVENTION

Field of the Invention

The present disclosure relates to an image forming apparatus and an image forming method capable of performing post-processing on a plurality of printing sheets having a same main scanning direction size.

Description of the Background Art

Some image forming apparatuses such as multifunction peripherals include a post-processing device (also referred to as a finisher) that performs post-processing such as stapling, punching, and saddle stitching on printed printing sheets. These pieces of post-processing are based on a premise that a plurality of printing sheets have a same size in a direction (hereinafter, referred to as a main scanning direction in this specification) orthogonal to a transport direction (hereinafter, referred to as a sub-scanning direction in this specification). Note that, some printing sheets have a different size (sub-scanning direction size) in a sub-scanning direction, even when the size (main scanning direction size) of the printing sheet in the main scanning direction is the same.

For example, the length of one side of printing sheets of both of A4 size and A3 size is 297 mm. In a case where a printing sheet is transported in such a way that the side thereof is aligned with the main scanning direction, the above-described post-processing can be performed, even when printing sheets of both of A4 size and A3 size are included. Further, the same is also applied, for example, to printing sheets of B5 size and B4 size, and to printing sheets of A5 size and A4 size. The foregoing is an example in a case where the size is a size of AB series, but also regarding the size of inch series, for example, 11"×8.5" (letter size) and 11"×17" (double letter size), 8.5"×11" (letter size) and 8.5"×13" (or 13.5"×14") (legal size), 8.5"×5.5" (half letter size) and 8.5"×11" (letter size), and the like are exemplified as combination in which the main scanning direction size is the same, and post-processing can be performed.

On the other hand, regarding the size of a printing document, it is not always a case that the main scanning direction size is aligned. A document may have a different main scanning direction size, and a different sub-scanning direction size. In this case, there are known a function (automatic rotation function) of rotating an image in a case where printing sheets of a same size are aligned only by rotating a document image by 90 degrees and interchanging vertical and horizontal sides of the image, and a function (automatic magnification selection function) of aligning printing sheets of a selected size by reducing or enlarging an image of each document in addition to image rotation.

Further, there is known an image processing apparatus that controls in such a way that a sheet having a size and an orientation capable of performing post-processing is fed based on a detected document size in an automatic sheet selection mode. However, the image processing apparatus is equivalent to the above-described automatic rotation function.

There is known a technique of displaying a message that notifies a user that there is no sheet, in a case where there is no sheet having a size and an orientation capable of performing post-processing in a sheet feeding cassette. However, it is not always a case that there is a sheet having a size and an orientation capable of performing post-processing only by performing automatic rotation. In this case, there is no choice but to cancel settings on post-processing, assuming that post-processing cannot be performed.

The present disclosure has been made in view of the circumstances as above, and an object of the present disclosure is to enable printing processing in which a user can easily recognize documents of different sizes, and settings on post-processing are less likely to be cancelled, even when a user operation or settings on a printer driver are not performed each time printing is performed, by applying image processing including margin increase/decrease adjustment to a document image.

SUMMARY OF THE INVENTION

The present disclosure provides an image forming apparatus including: a document reader that reads a plurality of documents having different sizes in a main scanning direction; a document size detector that detects a main scanning direction size and a sub-scanning direction size of each document; an image processor that performs image processing on an image of the read document; a printer that prints, on a printing sheet of a fixed size, the image that has or has not undergone the image processing; one or more post-processors that perform post-processing on a plurality of printing sheets having a same main scanning direction size according to a user setting; and one or more controllers that control reading of the document, the image processing, the printing, and the post-processing. In a case where the post-processing is set, and when the main scanning direction size is alignable to a main scanning direction size of one of the documents by applying, to an image of each document, at least one of image processing among rotation in the unit of 90 degrees, enlargement/reduction, and margin increase/decrease adjustment, the one or more controllers allows to perform the post-processing by aligning the main scanning direction size of each image with respect to the alignable size as a reference.

In addition, the present disclosure according to another aspect provides an image forming method including, by one or more controllers of an image forming apparatus: reading an image of a plurality of documents having different sizes in a main scanning direction; detecting a main scanning direction size and a sub-scanning direction size of each document; performing image processing on the read document as necessary; printing, on a printing sheet, the image that has or has not undergone the image processing; and performing post-processing on a plurality of printing sheets having a same main scanning direction size according to a user setting. Performing the image processing includes, in a case where the post-processing is set, and when the main scanning direction size is alignable to a main scanning direction size of one of the documents by applying, to an image of the document, at least one of image processing among rotation in the unit of 90 degrees, enlargement/reduction, and margin increase/decrease adjustment, allowing to perform the post-processing by aligning the main scanning direction size to a reference size.

In an image forming apparatus according to the present disclosure, in a case where post-processing is set, the one or more controllers allow to perform post-processing by aligning the main scanning direction size of each image to the size as a reference, as far as it is possible to align the main scanning direction size to the main scanning direction size of one of the documents by applying, to an image of each document, at least one of image processing among rotation in the unit of 90 degrees, enlargement/reduction, and margin increase/decrease adjustment. Therefore, it becomes possible to perform printing processing in which a user can easily recognize documents of different sizes, and settings on post-processing are less likely to be cancelled, even when a user operation or settings on a printer driver are not performed each time printing is performed.

The image forming method according to the present disclosure also achieves the same advantageous effect.

DESCRIPTION OF THE PREFERRED EMBODIMENTS

Hereinafter, the present disclosure is described in further detail with reference to the drawings. Note that, the following description is an example in all respects, and should not be construed to limit the present disclosure.

Configuration of Image Forming Apparatus Including Post-Processing Device

First, a configuration of an image forming apparatus including a post-processing device is described.

Figure 1:
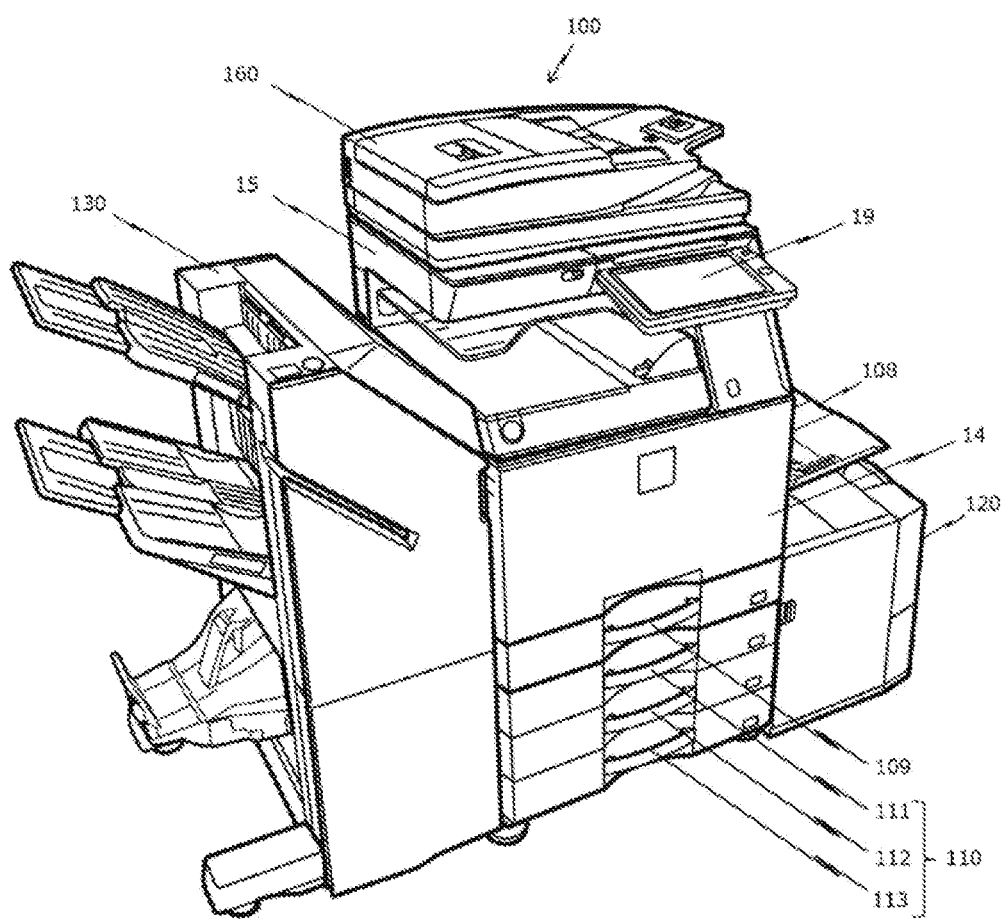
FIG. 1 is a perspective view illustrating an external appearance of a multifunction peripheral including a finisher, as an embodiment of an image forming apparatus according to the present disclosure.
Figure 2:
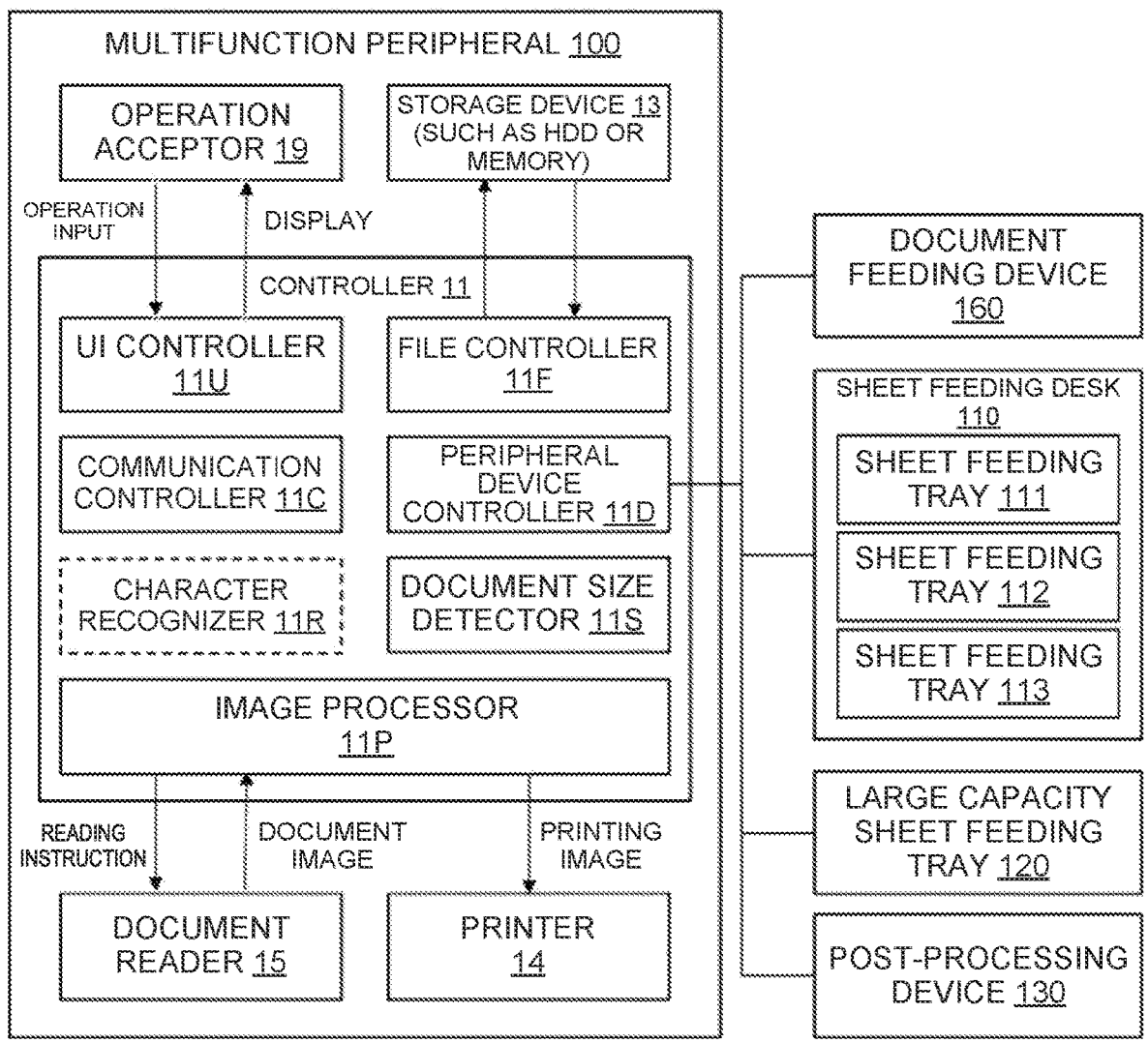
FIG. 2 is a block diagram illustrating a configuration of the multifunction peripheral illustrated in FIG. 1.

FIG. 1 is a perspective view illustrating an external appearance of a multifunction peripheral including a finisher, which is an aspect of an image forming apparatus in this embodiment. FIG. 2 is a block diagram illustrating a configuration of the image forming apparatus illustrated in FIG. 1.

As illustrated in FIG. 1, a multifunction peripheral 100 includes, as a main body, a printer 14, a document reader 15, an operation acceptor 19, a manual feed tray 108, and a sheet feeding tray 109. The multifunction peripheral 100 further includes, as peripheral devices, a sheet feeding desk 110, a large-capacity sheet feeding tray 120, a post-processing device 130, and a document feeding device 160. The main body includes the manual feed tray 108 and the sheet feeding tray 109, and the sheet feeding desk 110 includes three sheet feeding trays 111, 112, and 113. The manual feed tray 108, the sheet feeding trays 109, 111, 112, 113, and the large-capacity sheet feeding tray 120 accommodate printing sheets of different sizes, and printing can be performed by using, from among the printing sheets, a printing sheet of a size suitable for printing.

Further, as illustrated in FIG. 2, the main body of the multifunction peripheral 100 further includes one or more controllers 11, and a storage device 13. The one or more controllers 11 include a communication controller 11C, a peripheral device controller 11D, a file controller 11F, an image processor 11P, a document size detector 11S, and a user interface controller 11U. Further, a character recognizer 11R is optionally included.

The one or more controllers 11 are circuitry mainly configured of a processor and a memory as hardware resources. When the processor executes a control program stored in the memory, a function of each of the above-described units such as the peripheral device controller 11D, the image processor 11P, the document size detector 11S, and the user interface controller 11U is achieved.

The storage device 13 is configured to be accessible from the one or more controllers 11, and is a combination of a RAM and a nonvolatile memory. A double-data-rage synchronous dynamic random access memory (DDR SDRAM) such as DDR4 or DDR5 may be applied to the RAM. A solid state disk (SSD) or a hard disk drive (HDD) may be applied to the nonvolatile memory.

The printer 14 includes a mechanism and circuitry for performing charging, exposure, development, transfer, and fixation of an electrophotographic method, the sheet feeding tray 109 of the main body, and a sheet feeding and transporting mechanism for feeding and transporting a printing sheet, and is a portion that performs printing. The sheet feeding and transporting mechanism transports a printed printing sheet, and guides the printing sheet to the post-processing device 130.

The document reader 15 includes a mechanism and circuitry for scanning and reading a document, and an image sensor, and is a portion that generates image data associated with a document.

The operation acceptor 19 is configured to include a display device such as a liquid crystal display (LCD) or an organic light emitting (OLED) that displays a state of the multifunction peripheral 100 and information related to an operation, and an input detection device such as a touch panel that detects an operation.

The communication controller 11C included in the one or more controllers 11 controls communication with an external device via a communication circuit (not illustrated in FIG. 2) such as Ethernet.

The peripheral device controller 11D controls communication with a peripheral device (the sheet feeding desk 110, the large-capacity sheet feeding tray 120, the post-processing device 130, and the document feeding device 160) via intra-device serial communication, for example, such as RS422 that performs communication with the post-processing device 130.

The file controller 11F controls reading and writing of data from and to the storage device 13.

The image processor 11P controls processing related to document reading and printing, and image processing for a read document image. Regarding a relationship with respect to post-processing according to the present disclosure, rotation of a document image, margin increase/decrease adjustment and, image enlargement/reduction are performed, but image processing such ad image quality adjustment according to a user setting is performed in addition to the above.

The character recognizer 11R performs processing (character recognition processing) of extracting a character from a document image, and determining the character. Further, the top and bottom of a document image are determined based on placement of a recognized character, oblique correction is performed, or a margin area is determined.

The document size detector 11S detects the size of each document by using a sensor that detects the size of a physical document, or a document image. A main scanning direction size and a sub-scanning direction size are detected based on a premise that each document is rectangular.

The user interface controller 11U included in the controller 11U provides information to the user via the operation acceptor 19, and performs control related to processing of receiving a user operation.

Next, a configuration of the post-processing device 130 is described. The post-processing device 130 communicates with the peripheral device controller 11D of the main body, and performs an operation including a post-processing function in response to an instruction from the peripheral device controller 11D. As the post-processing function, stapling, punching, and saddle stitching are available. Any of the post-processing functions is intended for printing sheets having the same main scanning direction size.

Stapling is performed at one or two positions of a trailing end in a state that main scanning directions of a plurality of printing sheets are aligned, and the trailing ends are aligned.

Likewise, punching is performed at one or two positions of a trailing end in a state that main scanning directions of a plurality of printing sheets are aligned, and the trailing ends are aligned.

In saddle stitching, a center of saddle-stitched copy sheets is folded into two parts to form a center-folded booklet, and two positions on a center-folded line are stapled.

A printing sheet that has or has not undergone one of post-processing is discharged to one of three discharge trays of the post-processing device 130. Note that, a saddle-stitched booklet (printing sheets) is discharged to the lowermost discharge tray.

Example of Aligning Main Scanning Direction Size by Rotation (Conventional Example 1)

Figure 3:
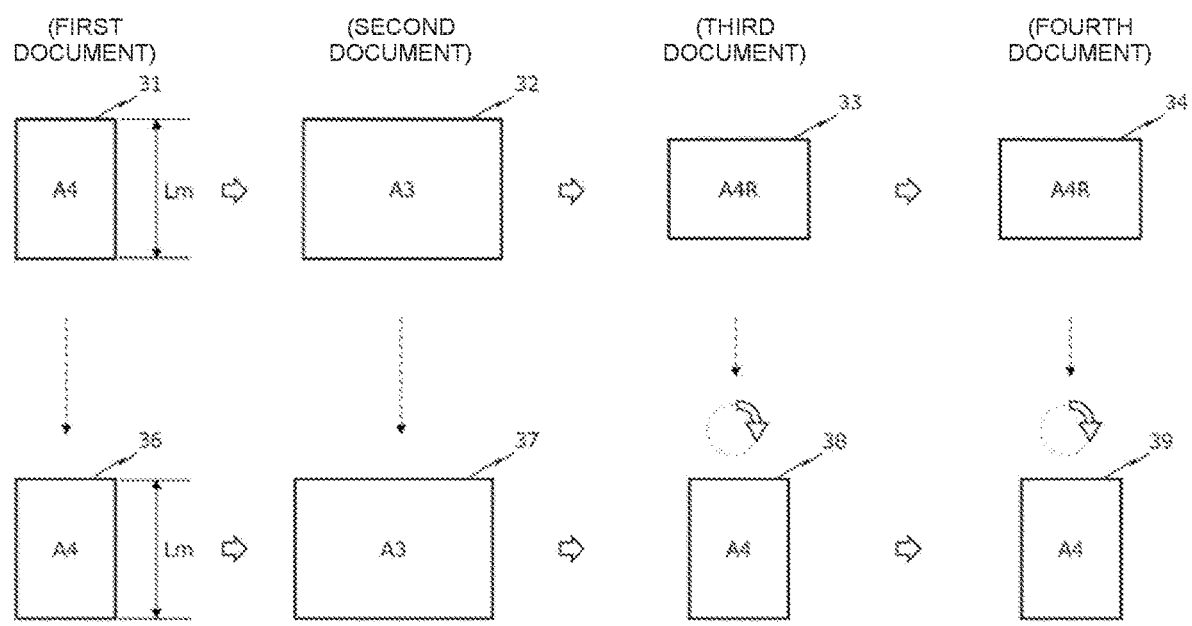
FIG. 3 is an explanatory diagram illustrating a conventional example in which a main scanning direction size is aligned by image rotation.

For reference, a conventional method of aligning a main scanning direction size by image rotation is described with reference to a drawing. FIG. 3 is an explanatory diagram illustrating a conventional example in which a main scanning direction size is aligned by image rotation. In the example illustrated in FIG. 3, four documents 31 to 34 are arranged from left to right in the upper row. The first document 31 has A4 size, and the long side of 297 mm is equivalent to the main scanning direction size (indicated by Lm in FIG. 3). The second document 32 has A3 size, and the short side of 297 mm is equivalent to the main scanning direction size. Each of the third document 33 and the fourth document 34 has A4 size, which is the same as that of the first document 31, but the main scanning direction size is aligned with the direction of 210 mm (hereinafter, referred to as A4R size).

When the one or more controller 11 read and prints the first document 31, the document size detector 11S detects that the document has A4 size, and the main scanning direction size is 297 mm. The main scanning direction size of the first document 31 serves as a reference for aligning the main scanning direction size of a succeeding document.

In the example illustrated in FIG. 3, it is assumed that priority is given to the set magnification (100%), and printing is performed by selecting an appropriate printing sheet, based on the document size and the set magnification (automatic sheet selection function).

Printing sheets to be selected by the one or more controllers 11 for each document based on the automatic sheet selection function in FIG. 3 are arranged from left to right in the lower row. Note that, since post-processing is set, it is assumed that a printing sheet is selected in such a way as to align the main scanning direction size by using image rotation. A printing sheet 36 associated with the document 31 has A4 size, and a printing sheet 37 associated with the document 32 has A3 size. A printing sheet 38 associated with the document 33 has A4 size acquired by rotating the document image. Likewise, a printing sheet 39 associated with the document 34 also has A4 size.

In this way, the one or more controllers 11 as the image processor 11P enable to perform post-processing by aligning the main scanning direction size by rotating the document images of the third and the fourth documents.

Example of Aligning Main Scanning Direction Size by Rotation and Enlargement/Reduction (Conventional Example 2)

Figure 4:
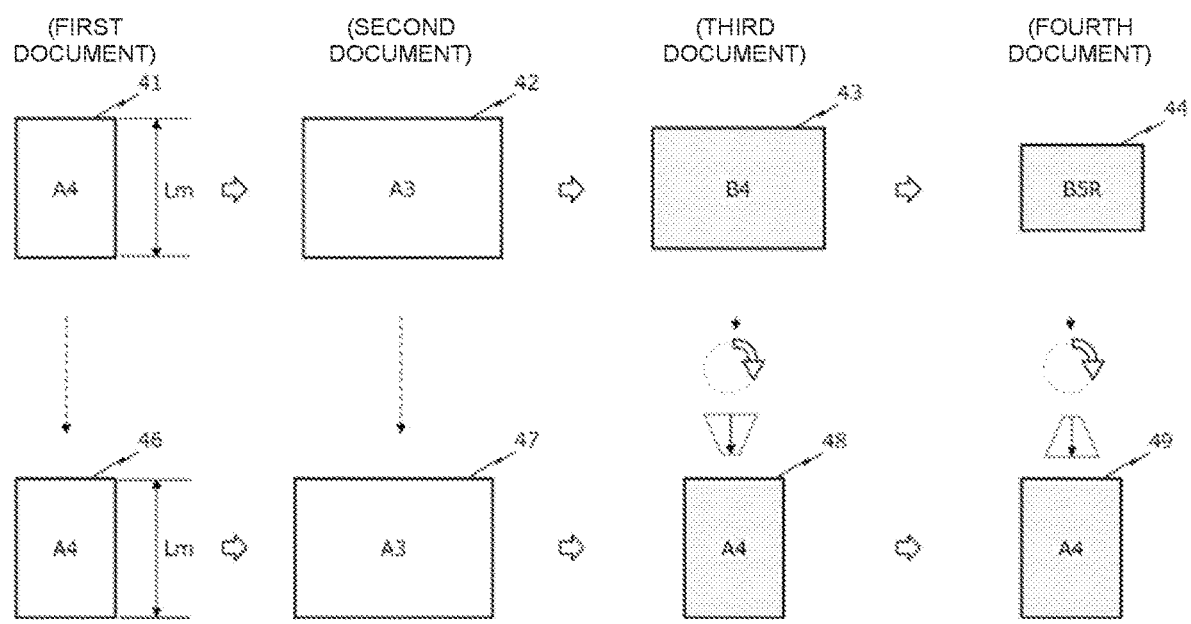
FIG. 4 is an explanatory diagram illustrating a conventional example in which a main scanning direction size is aligned by image rotation and image enlargement/reduction.

FIG. 4 illustrates an example of a conventional method of aligning the main scanning direction size by enlarging/reducing an image. Similarly to FIG. 3, a reference size for aligning the main scanning direction is a main scanning direction size of a first document 41, i.e., 297 mm.

In the example illustrated in FIG. 4, the size of the first document 41 and the size of a second document 42 are A4 size and A3 size as in the case of the example illustrated in FIG. 3. However, unlike the example illustrated in FIG. 3, the size of a third document 43 is B4 size. Further, unlike the example illustrated in FIG. 3, the size of a fourth document 44 is B5R size. The main scanning direction size of the documents 43 and 44 is not aligned, even when an image is rotated.

In the example illustrated in FIG. 4, the one or more controllers 11 align the main scanning direction size not only by image rotation but also by enlargement/reduction of a document image. The one or more controllers 11 align the main scanning direction size of the document 43 to a reference size of 297 mm by rotating a document image and reducing the image to A4 size. Note that, the document image of the document 43 may be enlarged to A3 size. The one or more controller 11 align the main scanning direction size of the document 44 to a reference size by rotating a document image and enlarging the image to A4 size. A printing sheet 46 associated with the document 41 has A4 size, and a printing sheet 47 associated with the document 42 has A3 size. A printing sheet 48 associated with the document 43 has A4 size by rotation and reduction. A printing sheet 49 associated with the document 44 has A4 size by rotation and enlargement.

In this way, the one or more controllers 11 as the image processor 11P can perform post-processing by aligning the main scanning direction size by rotating the document images of the third and fourth documents and further enlarging/reducing the document images.

Example of Aligning Main Scanning Direction Size by Adding Margin (Embodiment 1)

According to the present disclosure, one or more controllers 11 align the main scanning direction size without changing the magnification of a document image as much as possible. When the magnification of a document image is changed, for example, characters become small, which may make it difficult to read. In addition, when an image is enlarged, an edge of a line may be rounded, which may cause an image to look unnatural, or may cause a background or an image to look rough.

Figure 5:
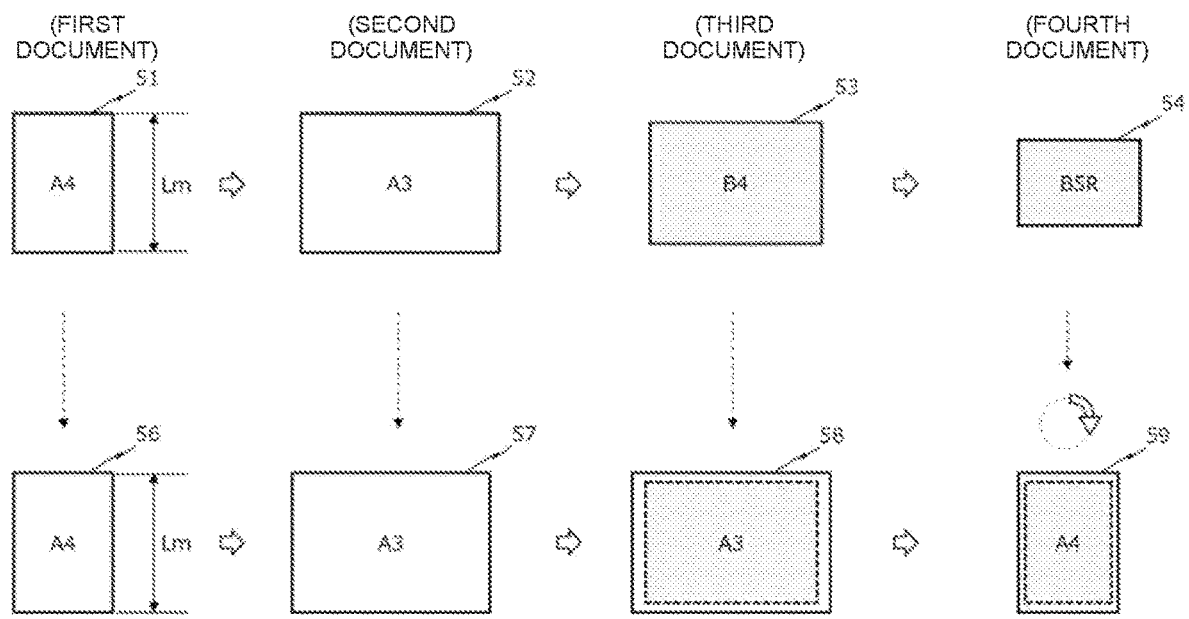
FIG. 5 is an explanatory diagram illustrating an example in which the multifunction peripheral illustrated in FIG. 1 enables to perform post-processing by aligning a main scanning direction size by margin addition and image rotation.

FIG. 5 is an explanatory diagram illustrating an example in which the main scanning direction size is aligned by adding a margin to a document image.

First to fourth documents 51 to 54 have the same size as in the example illustrated in FIG. 4. The main scanning direction size of the third document 53 is aligned to a reference size of 297 mm by adding a margin to both sides of a B4 size document having the main scanning direction size of 257 mm. The main scanning direction size of the document 54 is aligned to a reference size by rotating a document image and adding a margin to both sides. A printing sheet 56 associated with the document 51 has A4 size, and a printing sheet 57 associated with the document 52 has A3 size. A printing sheet 58 associated with the document 53 has A3 size by addition of a margin. A printing sheet 59 associated with the document 54 has A4 size by rotation and addition of a margin.

In this way, the one or more controller 11 as the image processor 11P enable to perform post-processing by aligning the main scanning direction size by adding a margin to document images of the third and fourth documents.

Note that, in a case where a margin of a document image is large, the margin may be reduced. For example, in the example illustrated in FIG. 5, in a case where a document image of the document 53 has a margin of a size in which the image is not lost, even when the document image of the document 53 is trimmed to A4 size, the margin may be reduced to A4 size by rotating the document image. The size of a margin can be determined by determining an area where a color pixel is present in a document image by the image processor 11P.

According to this embodiment, it becomes possible to perform image formation with post-processing while maintaining the magnification of an original image.

In the example illustrated in FIG. 5, a margin is added equally to both sides in any of the main scanning direction and the sub-scanning direction, but a configuration of adding a margin is not limited thereto. For example, in a case of post-processing in which stapling is performed at an upper left corner of a printing sheet, a margin may be added only on a lower end in the main scanning direction, and only on a right end in the sub-scanning direction. In this way, in a case where a user considers afterwards that a margin added to printed and stapled pages may be unnecessary, the margins added to the lower end and the right end of the pages can be cut off with scissors or the like to have the same size as the original document.

Likewise, in a case of post-processing in which stapling is performed at two positions, i.e., upper and lower positions on a left end of a printing sheet, for example, a margin may be added to both of an upper end and a lower end in the main scanning direction, and only on a right end in the sub-scanning direction.

Example of Aligning Main Scanning Direction by Minimizing the Number of Document Images to be Enlargement/Reduction (Embodiment 2)

In any of the conventional examples 1 and 2 and the embodiment 1, the main scanning direction size of a succeeding document is aligned with respect to the main scanning direction size of a first document as a reference. In contrast, in this embodiment, a reference for aligning the main scanning direction size is not limited to the first document, and an optimal size is used as a reference from the viewpoint of minimizing the number of document images to be enlarged or reduced. Note that, the embodiment 1 is not intended to limit the reference size to the main scanning direction size of the first document. Similarly to this embodiment, an optimal size may be used as a reference from the viewpoint of minimizing the number of document images for which enlargement/reduction or margin increase/decrease adjustment is performed.

In other words, the optimal size in this embodiment may be said to be a size in which the number of sides having a same length is largest among a length of a vertical side or a horizontal side of each document. The main scanning direction size is aligned with respect to the length of the side as a reference.

Note that, according to this configuration, the reference size cannot be determined until the size of each document is detected. Therefore, printing cannot be started. However, in terms of adopting a criterion capable of minimizing the number of document images to be reduced or enlarged, printing finishing can be made more preferable than a case where the main scanning direction size of the first document is used as a reference.

In the conventional automatic magnification selection function, printing is performed by enlarging/reducing an image of each document in such a way as to acquire a specified sheet size. Further, in the conventional examples 1 and 2 and the embodiment 1, the main scanning direction size is aligned with respect to the main scanning direction size of the first document as a reference. In contrast, according to this configuration, the main scanning direction size serving as a reference is determined in such a way that the number of document images having a size different from the main scanning direction size serving as a reference is minimized. This enables to minimize the number of images subjected to magnification.

Example of Aligning Main Scanning Direction by Minimizing Enlargement Magnification and Maximizing Reduction Magnification (Embodiment 3)

This embodiment is similar to the embodiment 2 in an aspect that a reference for aligning the main scanning direction size is not limited to the first document. In the embodiment 2, attention is paid to minimizing the number of document images to be reduced or enlarged. However, in this embodiment, attention is paid to making the magnification of reduction or enlargement close to 100%.

As the main scanning direction size used as a reference in this embodiment, a reference size is determined in such a way that the magnification of a document image to be enlarged and the reduction magnification of a document to be reduced are as close to a same size magnification as much as possible, when the main scanning direction size is aligned by applying image rotation and reduction/enlargement to each document as in the conventional example 2.

Also in this configuration, similarly to the embodiment 2, a reference size cannot be determined until the size of each document is detected. Therefore, printing cannot be started. However, in terms of adopting a criterion capable of making a document image to be reduced and enlarged close to the same size magnification, printing finishing can be made more preferable than a case where the main scanning direction size of the first document is used as a reference.

According to this configuration, the reference main scanning direction size is determined in such a way that a document image to be reduced and enlarged is made close to the same size magnification. This enables to make the magnification of an image to be magnified close to the same size magnification.

Example of Aligning Main Scanning Direction Size by Processing According to Whether Character is Included (Embodiment 4)

In this embodiment, one or more controllers 11 include a character recognizer 11R, and it is assumed that it is determined whether each document includes character data.

The one or more controllers 11 do not enlarge or reduce a document including character data as much as possible. For a reason as described above, for example, margin increase/decrease adjustment is given priority over enlargement/reduction. In a case where it is determined that the main scanning direction size cannot be aligned without enlargement and reduction even when the above processing is performed, a reference size is determined in such a way as to make a magnification close to the same size magnification as much as possible.

On the other hand, regarding a document that is determined not to include character data, the main scanning direction size of these documents is aligned to a reference size by performing image rotation and enlargement/reduction as in the case of the conventional example 2.

When characters are enlarged or reduced, a document including the characters tends to be difficult to be read, as compared with an original document. Therefore, the document including the characters is set to have a same size magnification or a magnification close thereto. On the other hand, a document including only an image and including no character is handled in the same manner as in the conventional example 2, assuming that the document does not give a sense of incongruity even when enlargement or reduction is performed.

Figure 6:
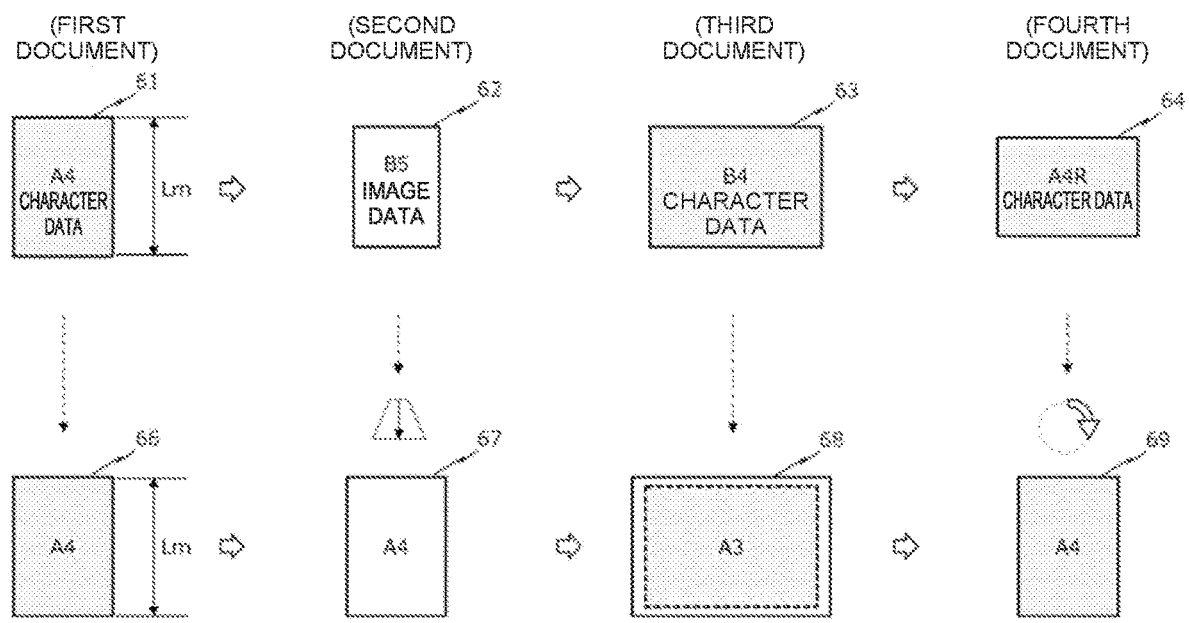
FIG. 6 is an explanatory diagram illustrating an example in which the multifunction peripheral illustrated in FIG. 1 enables to perform post-processing by aligning a main scanning direction size by image enlargement, margin addition, and image rotation according to presence or absence of a character.

FIG. 6 is an explanatory diagram illustrating an example of aligning the main scanning direction size according to this embodiment.

Similarly to the example illustrated in FIG. 5, first and third documents 61 and 63 respectively have A4 size and B4 size. A second document has A3 size, and a fourth document has A4R size. It is assumed that a second document 62 is determined to have a document image of only image data by the character recognizer 11R, and the first document 61, the third document 63, and a fourth document 64 are determined to have a document image including character data.

In order to align the main scanning direction size without changing the magnification of the first document 61, the third document 63, and the fourth document 64 including character data, the one or more controllers 11 determine that the reference size for aligning the main scanning direction size is 297 mm.

The main scanning direction size of the first document 61 is a reference size, as it is. The main scanning direction size of the fourth document 64 can be aligned to the reference size by image rotation. Although the main scanning direction size of the third document 63 cannot be aligned to the reference size even when an image is rotated, but the main scanning direction size can be aligned to the reference size by acquiring A3 size by adding a margin to both sides.

Regarding the second document 62 that does not include character data, the main scanning direction size is aligned to the reference size by changing the magnification.

Therefore, a printing sheet 66 associated with the document 61 has A4 size, and a printing sheet 67 associated with the document 62 has A4 size. A printing sheet 68 associated with the document 63 has A3 size, and a printing sheet 69 associated with the document 64 has A4 size.

In this way, the one or more controllers 11 as the image processor 11P can align the main scanning direction size and perform post-processing by enlarging a document image of the second document, adding a margin to a document image of the third document, and rotating the fourth document.

Similarly to the embodiment 1, in a case where a margin of a document image is large, the margin may be reduced. Further, in a case where a document including character data has to be enlarged or reduced, similarly to the embodiment 3, the reference size is determined in such a way that the magnification of a document image to be enlarged and the reduction magnification of a document to be reduced are made close to the same size magnification as much as possible.

According to this configuration, the user can easily read an image of a document including characters by keeping the size of the characters unchanged or minimizing the change by performing printing at the same magnification as that of an original image or at a magnification close thereto.

Configuration in which Selection is Made as to Whether Priority is Given to Post-Processing or Size (Embodiment 5)

In the embodiments 1 to 4 described above, in a case where it is determined that a document size in which the main scanning direction size cannot be aligned only by image rotation is detected, the one or more controllers 11 may allow the user to select whether printing is performed by giving priority to settings on post-processing, or settings on post-processing are cancelled and printing is performed with a size based on settings on a size and a magnification of a document.

Figure 7:
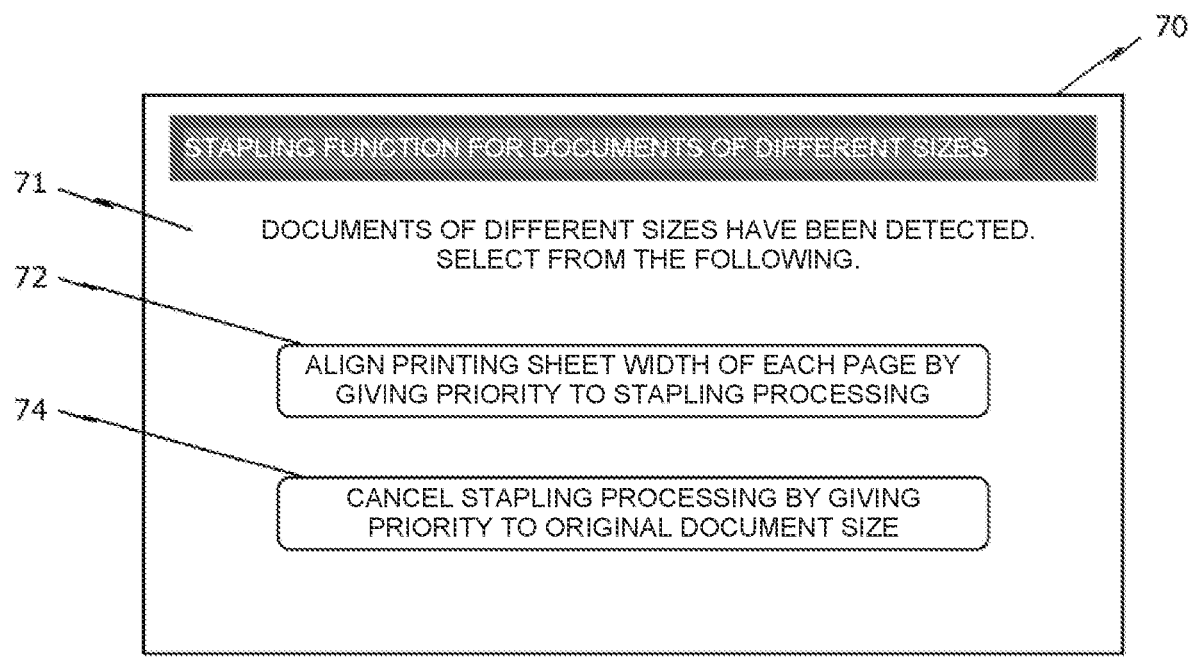
FIG. 7 is an explanatory diagram illustrating an example of a pop-up window to be displayed on an operation acceptor of the multifunction peripheral illustrated in FIG. 1.

For example, in the example illustrated in FIG. 5, when document sizes of the third document 53 and the fourth document 54 are detected, and it is determined that the main scanning direction size cannot be aligned only by image rotation, one or more controllers 11 as one or more user interface controller 11U cause an operation acceptor 19 to display a pop-up window 70 illustrated in FIG. 7.

As illustrated in FIG. 7, the one or more controllers 11 cause the pop-up window 70 to display a message 71 "A document of a different size is detected. Select one of the following". Further, two options are displayed beneath the message 71.

The first option is a post-processing priority button 72. As illustrated in FIG. 7, the post-processing priority button 72 provides an option of performing printing by "giving priority to stapling processing, and aligning the width of a printing sheet of each page".

The second option is a size priority button 74. As illustrated in FIG. 7, the size priority button 74 provides an option of performing printing by "giving priority to the size of an original document, and canceling stapling processing".

When one of the post-processing priority button 72 and the size priority button 74 is touched, the one or more controllers 11 as the user interface controller 11U perform printing according to the user's selection. In other words, in a case where the post-processing priority button 72 is touched, image processing as described in the embodiments 1 to 4 is performed, and post-processing is performed. On the other hand, in a case where the size priority button 74 is touched, post-processing is cancelled, and printing is performed by selecting a printing sheet according to a document size without aligning the main scanning direction size.

According to this configuration, allowing the user to preferentially select post-processing or a size makes it possible to prevent printing against the user's intention from being performed even for the user who attaches importance to a magnification rather than post-processing.

Note that, FIG. 7 illustrates an example in which a pop-up window is displayed when the user executes a job, but the embodiment is not limited thereto. For example, a setting menu that receives in advance settings as to whether to give priority to post-processing or a document size may be prepared. This saves time for the user to perform an operation of selection on the pop-up window 70 when executing a job.

Flowchart According to Embodiment 1

Hereinafter, processing to be performed by the one or more controllers 11 is described with reference to a flowchart.

Figure 8:
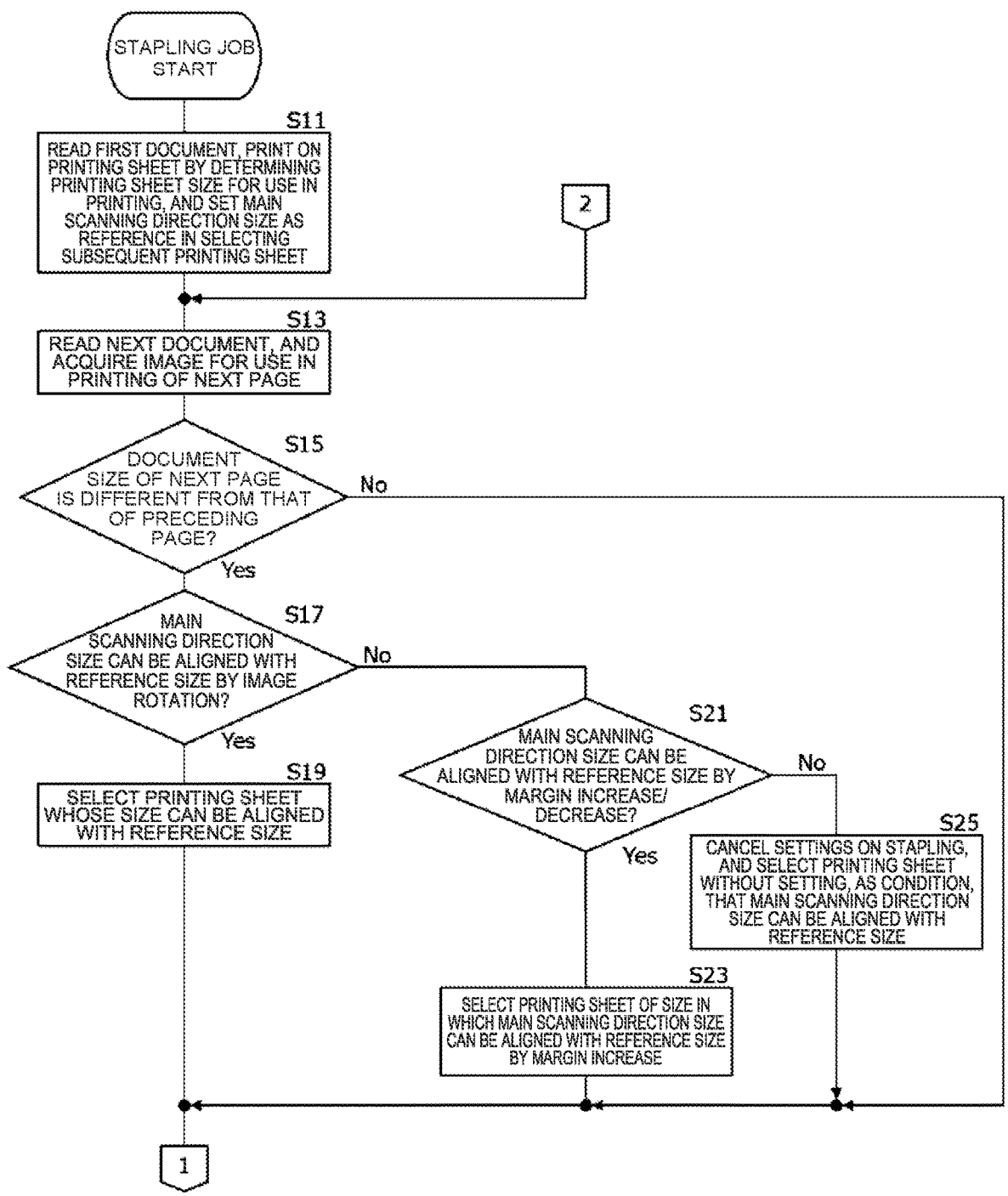
FIG. 8 is a flowchart illustrating an example of processing according to embodiment 1 to be performed by one or more controllers illustrated in FIG. 2.
Figure 9:
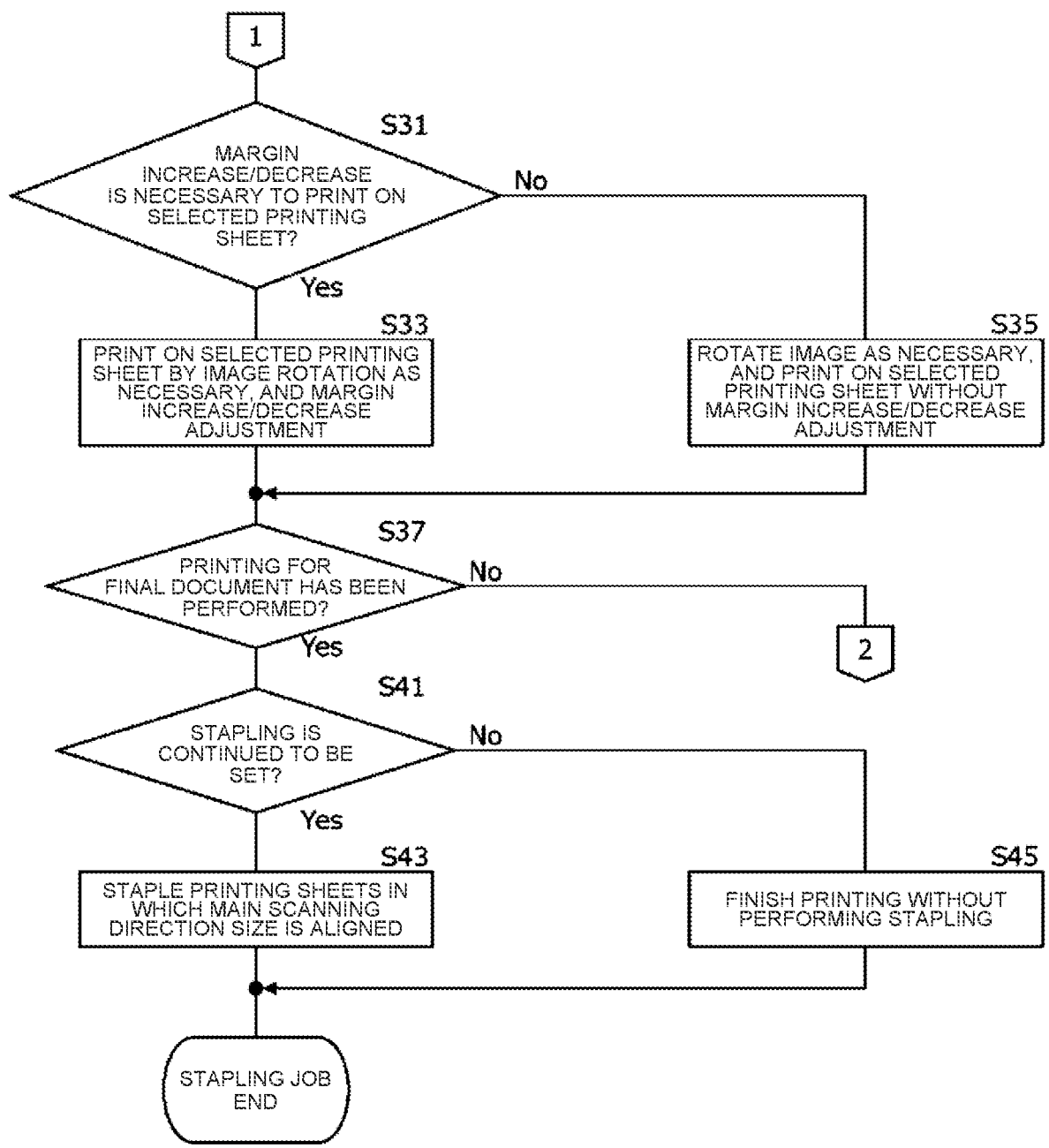
FIG. 9 is a flowchart illustrating an example of processing subsequent to FIG. 8.

FIG. 8 is a flowchart illustrating an example of processing according to the embodiment 1. FIG. 9 is a flowchart illustrating an example of processing subsequent to FIG. 8.

The flowchart illustrated in FIG. 8 assumes a copy job in which stapling is set as an example of a job including post-processing. It is assumed that document reading is performed by using the document feeding device 160.

When receiving an instruction to execute a job from a user by the user interface controller 11U, the one or more controllers 11 as the peripheral device controller 11D instruct the document feeding device 160 to feed a document. Then, the controller 11 as the image processor 11P reads the first document (document 51 illustrated in FIG. 5) to be fed. In addition, the one or more controllers 11 as the document size detector 11S detect the size of the document 51. The one or more controller 11 as the image processor 11P determine the size of a printing sheet for use in printing of the read document 51. In the example illustrated in FIG. 5, the printing sheet has A4 size. Then, an image of the first document is printed on the printing sheet of the selected size. In addition, the main scanning direction size of 297 mm of the document 51 is set as a reference size in selecting a printing sheet associated with the succeeding documents 52 to 54 (step S11).

Following reading of the first document (the document 51 in the example illustrated in FIG. 5), the one or more controllers 11 read the next document (the document 52 in the case of the document 51), and detects the size of the next document (the document 52) (step S13). Then, in order to determine the size of a printing sheet for use in printing of the next document (document 52), the one or more controllers 11 as the image processor 11P perform the following determination. First, it is determined whether the size of the next document (document 52) is different from that of the previous document (document 51) (step S15). When the size is the same as that of the previous document (No in step S15), the processing is proceeded to printing processing in step S31 in FIG. 9.

When the size is different from that of the previous document (Yes in step S15), it is determined whether the main scanning direction size can be aligned by rotating the image as necessary (step S17). In the example of the document 52 illustrated in FIG. 5, the size of the document is A3 size, and the main scanning direction size is aligned to the reference size of 297 mm without rotating the image. Therefore, the determination in step S17 is Yes.

In a case where the determination in step S17 is Yes, the one or more controllers 11 as the image processor 11P select a printing sheet in which the main scanning direction size is aligned to the reference size by including image rotation. In the example of the document 52, a printing sheet of A3 size is selected. Then, the processing is proceeded to step S31 in FIG. 9.

On the other hand, in a case where the determination in step S17 is No (in the example illustrated in FIG. 5, a case where the previous document is the document 52, and the next document is the document 53), the one or more controllers 11 as the image processor 11P determine whether the main scanning direction size can be aligned to the reference size by increasing or decreasing a margin (step S21). In the example of the document 53 illustrated in FIG. 5, since the main scanning direction size can be aligned to the reference size by acquiring A3 size by adding a margin to the document 53 of B4 size, the determination of step S21 is Yes. Also in the example of the document 54, the main scanning direction size can be aligned to the reference size by rotating the image of the document 54 of B5R size and acquiring A4 size by adding a margin. Therefore, the determination in step S21 is Yes. Although it is not impossible to align the size to A3 size by adding a margin without rotating the image of the document 54, it is determined that A4 size requiring a smaller margin is preferable.

In a case where the determination in step S21 is Yes, the one or more controllers 11 as the image processor 11P select a printing sheet in which the main scanning direction size is aligned to the reference size by including image rotation. In the example of the document 53, a printing sheet of A3 size is selected. In the example of the document 54, a printing sheet of A4 size is selected. Then, the processing is proceeded to step S31 in FIG. 9.

On the other hand, in a case where the determination in step S21 is No, the one or more controllers 11 as the image processor 11P determine that the main scanning direction size of a target document cannot be aligned to the reference size, and cancels settings on post-processing. Therefore, regarding a document after the target document, printing is continued by selecting an appropriate printing sheet without performing image processing for aligning the main scanning direction size to the reference size.

Step S31 illustrated in FIG. 9 is printing processing for the next document. The one or more controllers 11 as the image processor 11P determine whether a margin needs to be increased or decreased in order to perform printing on a selected printing sheet.

In a case where it is determined that a margin needs to be increased or decreased (Yes in step S31), a document image is printed on a selected printing sheet by rotating the document image as necessary, and increasing or decreasing a margin (step S33). Then, the processing is proceeded to step S37.

On the other hand, in a case where it is determined that margin increase/decrease adjustment is unnecessary (No in step S31), the document image is printed on a selected printing sheet by rotating the document image as necessary without performing margin increase/decrease adjustment (step S35). Then, the processing is proceeded to step S37.

In step S37, the one or more controllers 11 as the image processor 11P determine whether printing processing has been performed for the final document.

In a case where the processing has not been performed for the final document (No in step S37), the processing returns to step S13 illustrated in FIG. 8, and the processing is continued for the next document. In the example illustrated in FIG. 5, the processing for the documents 52, 53 and 54 is continued as described above.

In a case where it is determined in step S37 that the processing has been performed for the final document (Yes in step S37, in the example illustrated in FIG. 5, a case where the processing for the document 54 has been completed), subsequently, it is determined whether settings on post-processing (stapling) have not been cancelled in the above-described processing in step S25 (step S41).

When settings on post-processing (stapling) have not been cancelled (Yes in step S41), post-processing (stapling) is performed for printing sheets in which the main scanning direction size is aligned (step S43), and the job is finished.

On the other hand, in a case where settings on post-processing (stapling) have been cancelled (No in step S41), post-processing (stapling) is not performed (step S45), and the job is finished.

The foregoing is a flow of a copy job in which stapling is set as a specific example of processing according to the embodiment 1 illustrated in FIGS. 8 and 9.

Flowchart According to Embodiment 2

Next, a flow of processing according to the embodiment 2 is described.

Figure 10:
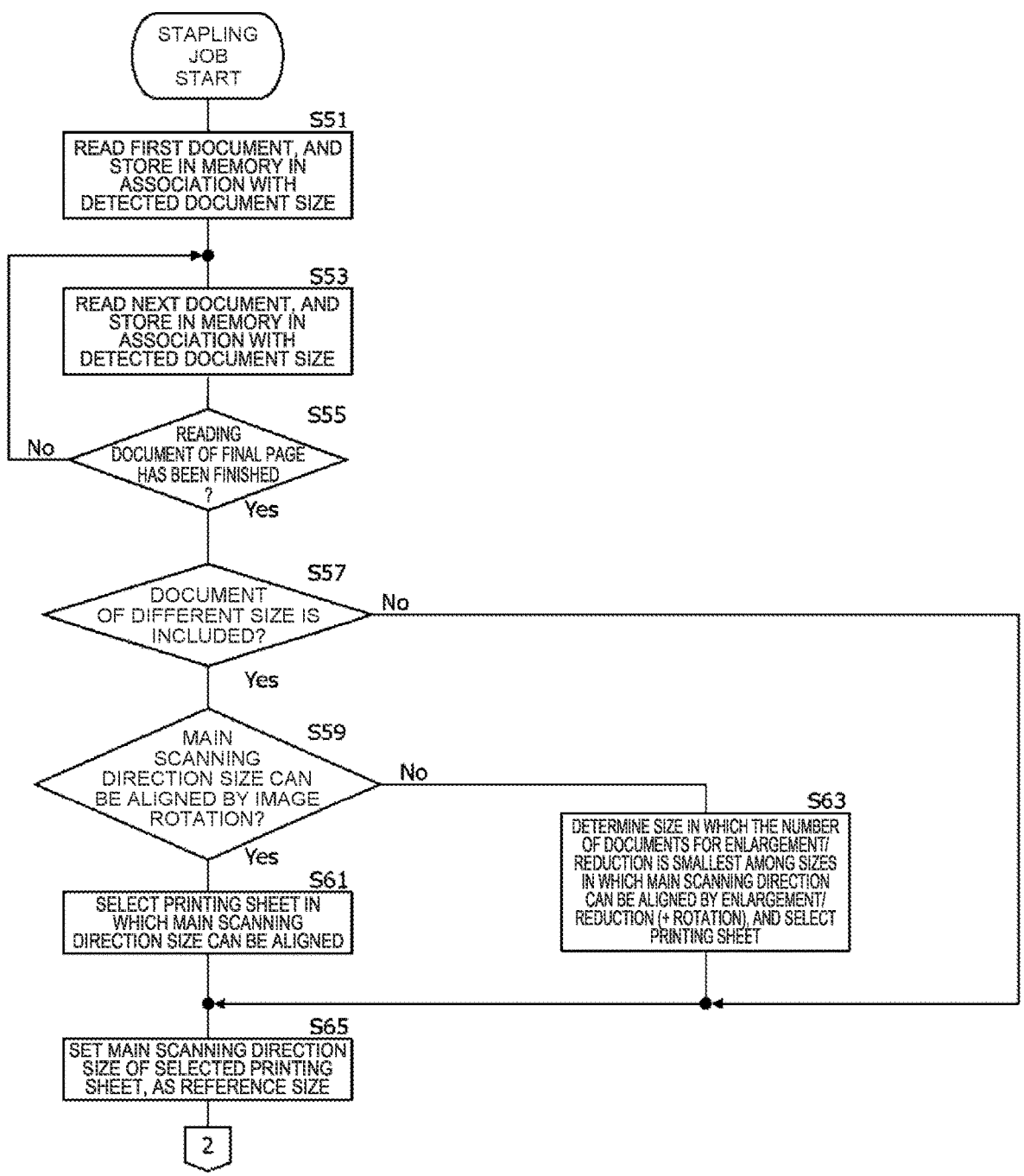
FIG. 10 is a flowchart illustrating an example of processing according to embodiment 2 to be performed by the one or more controllers illustrated in FIG. 2.
Figure 11:
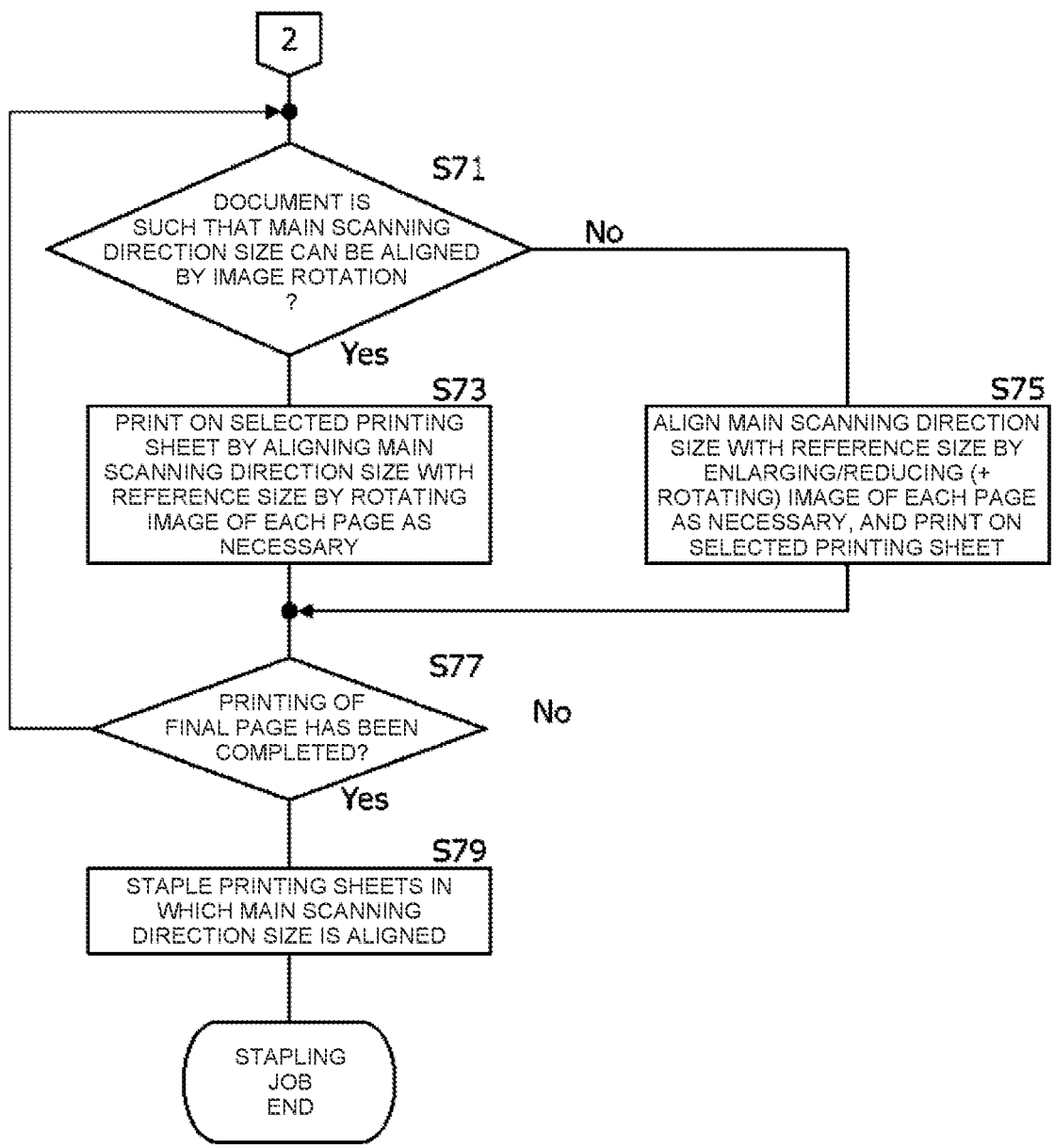
FIG. 11 is a flowchart illustrating an example of processing subsequent to FIG. 10.

FIG. 10 is a flowchart illustrating an example of processing according to the above-described embodiment 2. FIG. 11 is a flowchart illustrating an example of processing subsequent to FIG. 10.

Description on processing common to the flowcharts illustrated in FIGS. 8 and 9 is simplified. In the embodiment 2, a reference size for aligning the main scanning direction size is determined after document reading is completed, and printing is started. Further, it is assumed that image processing to be applied to each document is image rotation and enlargement/reduction. Although it is possible to combine with margin increase/decrease adjustment described in the embodiment 1, herein, margin increase/decrease adjustment is not combined in order to simplify the description and facilitate understanding.

As illustrated in FIG. 10, when an instruction to execute a job is received from the user by the user interface controller 11U, the one or more controllers 11 as the image processor 11P read the first document. Further, the controller as the document size detector 11S detects the size of the document. The one or more controllers 11 as the image processor 11P associate the read document image with the detected document size with each other. The one or more controllers 11 as the file controller 11F store the data in the storage device 13 (step S51).

After reading the first document, the one or more controllers 11 read the next document, and detects the size of the next document. Then, the one or more controllers 11 associate the document image of the next document with the detected document size. The one or more controllers 11 as the file controller 11F store the data in the storage device 13 (step S53).

Then, the one or more controllers 11 as the image processor 11P determine whether the last document has been read (step S55). In a case where the last document has not been read yet (No in step S55), the processing returns to step S53, and the next document is read. Then, the one or more controllers 11 store the document image of each document and the detected document size in the storage device 13 in association with each other.

In a case where it is determined in step S55 that the last document has been read (Yes in step S55), the one or more controllers 11 as the image processor 11P refer to the size of each read document, and determines whether a document of a different size is included (step S57). In a case where all the documents have the same size (No in step S57), the processing is proceeded to step S65 to be described later.

In a case where a document of a different size is included (Yes in step S57), it is determined whether the main scanning direction size can be aligned by rotating the image as necessary (step S59).

In a case where the main scanning direction size can be aligned by image rotation (Yes in step S59), a printing sheet associated with the size is selected (step S61), and the processing is proceeded to step S65 to be described later.

In a case where the main scanning direction size cannot be aligned only by image rotation (No in step S59), a size capable of aligning the main scanning direction size is determined by further including enlargement/reduction of the document image. Then, a printing sheet associated with the size is selected. Herein, although the main scanning direction can be aligned for one of the printing sheets by combining image rotation and enlargement/reduction, in this embodiment, a size in which the number of documents to be enlarged or reduced is minimized is selected as a reference (step S63).

Although FIG. 4 is not a diagram according to this embodiment but is a diagram according to a conventional example, for the sake of convenience, description is made with reference to FIG. 4. FIG. 4 illustrates an example of four documents of A4 size, A3 size, B4 size, and B5R size. In the conventional example illustrated in FIG. 4, 297 mm, which is the main scanning direction size of the first document 41, is the reference size. However, by combining image rotation and enlargement/reduction, the main scanning direction size can be aligned to a size other than 297 mm.

For example, it is possible to align the main scanning direction size of 257 mm of the third document 43 of B4 size. In this case, the image of the document 41 of A4 size may be rotated and enlarged. The second document 42 may be reduced. The fourth document 44 may be enlarged. In this case, the number of documents to be enlarged or reduced is three.

Further, it is also possible to align the main scanning direction size of 182 mm of the fourth document 44 of B5R size. In this case, the image of the document 41 may be rotated and reduced, and the images of the documents 42 and 43 may be reduced. In this case, the number of documents to be enlarged or reduced is three.

As in the case of FIG. 4, by aligning the main scanning direction size to 297 mm, the number of documents to be enlarged or reduced is two, and consequently, it is possible to set 297 mm, as a reference for the main scanning direction size, as in the conventional example 2. However, the processing of determining a reference is different from that of the conventional example 2.

As described above, the one or more controllers 11 as the image processor 11P determine the reference size for aligning the main scanning direction size in such a way as to minimize the number of documents to be enlarged or reduced (step S65).

When the reference size is determined, the one or more controllers 11 as the image processor 11P perform image rotation as necessary, but determines whether printing can be performed on a selected printing sheet without performing enlargement or reduction (step S71).

In a case where it is determined that printing is possible only by image rotation as necessary (Yes in step S71), a document image is printed on a selected printing sheet after aligning the main scanning direction size by rotating the necessary document image (step S73). Then, the processing is proceeded to step S77.

On the other hand, in a case where it is determined that enlargement/reduction is necessary (No in step S71), the document image is printed on a selected printing sheet by rotating the document image as necessary, and performing enlargement/reduction as necessary (step S75). Then, the processing is proceeded to step S77.

In step S77, the one or more controllers 11 as the image processor 11P determine whether processing related to printing has been performed for the final document.

In a case where processing related to printing has not been performed yet for the final document (No in step S77), the processing returns to step S71 illustrated in FIG. 8, and processing related to printing is continued for the next document.

In a case where it is determined in step S77 that processing related to printing has been performed for the final document (Yes in step S77), post-processing (stapling) is performed on printing sheets in which the main scanning direction size is aligned (step S79), and the job is finished.

The foregoing is a flow of a copy job in which stapling is set as a specific example of processing according to the embodiment 2 illustrated in FIGS. 10 and 11.

Note that, since processing according to the embodiment 3 has many similar points to that of the embodiment 2 regarding a flow of processing, the flowchart is omitted.

Flowchart According to Embodiment 4

Next, a flow of processing according to the embodiment 4 is described.

Figure 12:
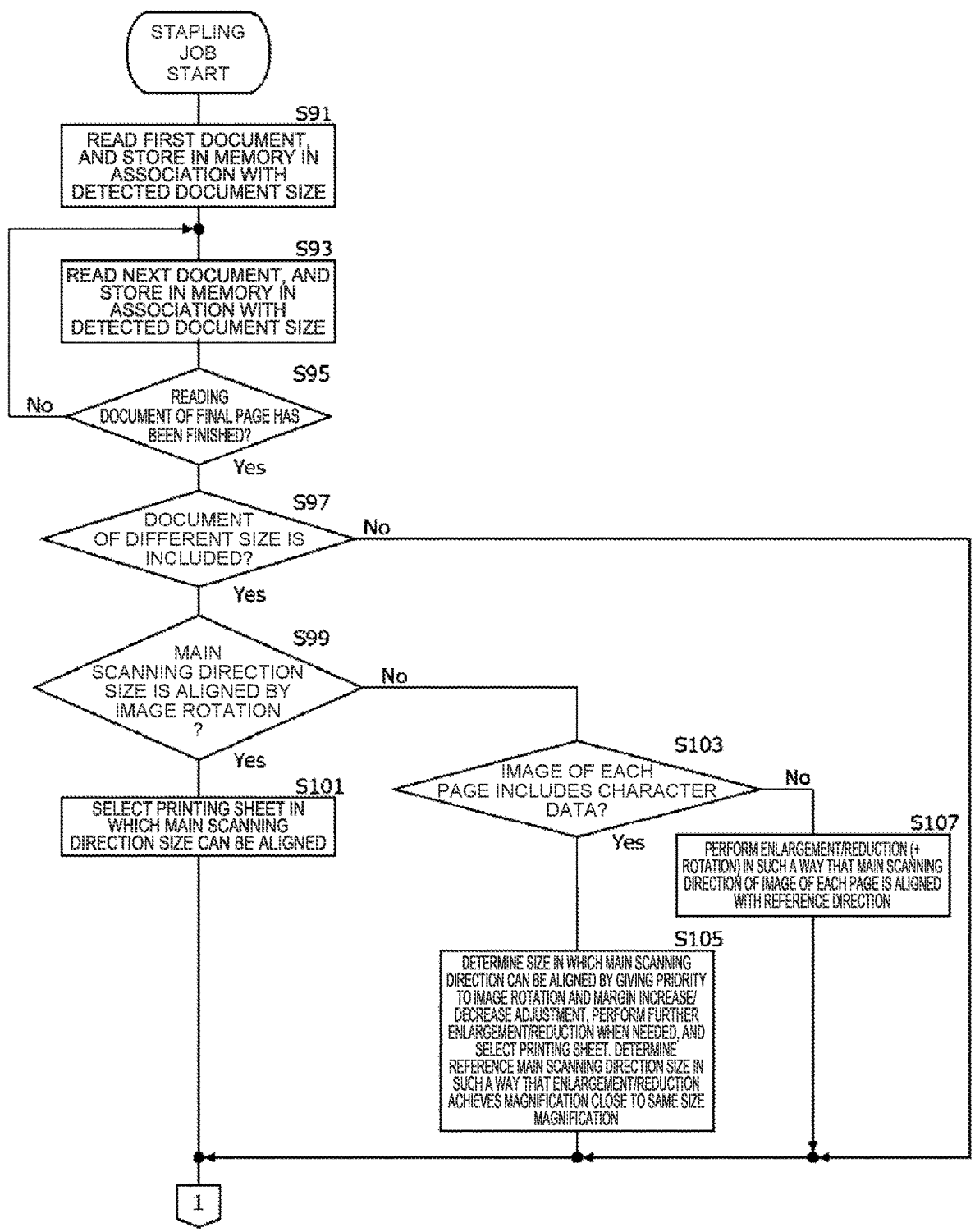
FIG. 12 is a flowchart illustrating an example of processing according to embodiment 4 to be performed by the one or more controllers illustrated in FIG. 2.
Figure 13:
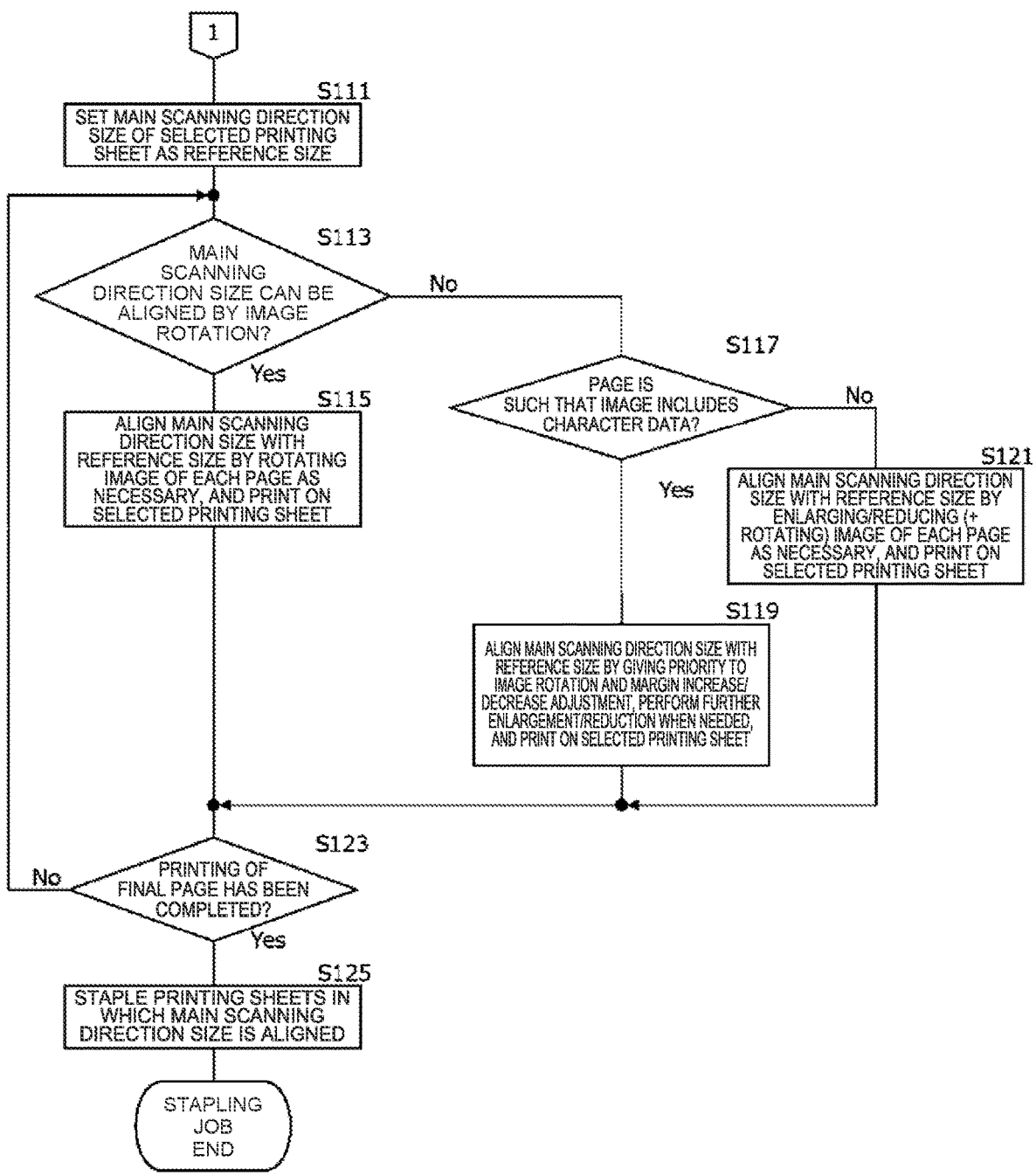
FIG. 13 is a flowchart illustrating an example of processing subsequent to FIG. 12.

FIG. 12 is a flowchart illustrating an example of processing according to the embodiment 4. FIG. 13 is a flowchart illustrating an example of processing subsequent to FIG. 12.

Description on processing common to the flowcharts illustrated in FIGS. 10 and 11 is simplified, and the flow of processing is described below by focusing on the differences. In the embodiment 2, a document (text document) including character data is determined by performing character recognition. Regarding a text document, priority is given to image rotation and margin increase/decrease adjustment over enlargement/reduction. In a case where it is determined that the main scanning direction size cannot be aligned without enlargement or reduction even when the above processing is performed, the reference size is determined in such a way that the magnification of enlargement or reduction is close to the same size magnification.

Since the processing of steps S91 to S101 illustrated in FIG. 12 is respectively associated with steps S51 to S61 illustrated in FIG. 10, description thereof is omitted.

In step S99, the one or more controllers 11 determine whether the main scanning direction size can be aligned by rotating an image as necessary. However, in a case where the main scanning direction size cannot be aligned only by image rotation (No in step S99), the following processing is performed.

The one or more controller 11 as the character recognizer 11R determine whether the image of each document includes character data, and determines whether the document is a document (text document) including character data or a document (image document) other than the above (step S103).

Regarding a text document (Yes in step S103), the main scanning direction size is aligned by giving priority to processing of rotating each document image, and then giving priority to processing of increasing or decreasing a margin of each document. In a case where the main scanning direction size of each document cannot be aligned even when the above processing is performed, enlargement/reduction is further performed. In this case, a reference size for aligning the main scanning direction size is selected in such a way that the magnification of the document that needs to be enlarged or reduced is close to the same size magnification (step S105).

On the other hand, regarding an image document (No in step S103), the main scanning direction size is aligned to the reference size by applying image rotation and enlargement/reduction as necessary as in the case of the conventional example 2 (step S107). Herein, the reference size is a reference size determined for a text document.

Note that, in a case where a document is only an image document, the reference size may be determined by applying the method of the embodiment 3.

As described above, the one or more controllers 11 as the image processor 11P determine the reference size for aligning the main scanning direction size in such a way that the magnification of enlargement/reduction of a text document is close to the same size magnification (step S111 illustrated in FIG. 13).

Subsequent steps S113, S115, S123, and S125 are respectively equivalent to steps S71, S73, S77, and S79 in FIG. 11, description thereof is omitted.

In step S113, the one or more controllers 11 as the image processor 11P determine whether printing can be performed on a selected printing sheet only by image rotation. However, in a case where it is determined that the main scanning direction size cannot be aligned only by image rotation (No in step S113), the following processing is performed.

In a case where a document is a text document (Yes in step S117), based on determination as to whether each document is a text document or an image document (step S117), the main scanning direction size is aligned by giving priority to processing of rotating each document image, and then giving priority to processing of increasing or decreasing a margin of each document. Regarding a document in which the main scanning direction size of each document cannot be aligned even when the above processing is performed, enlargement/reduction is further performed (step S119). In this case, the reference size is selected in such a way that the magnification of the document that needs to be enlarged or reduced is close to the same size magnification by the processing of step S105 described above.

Regarding the image document (No in step S117), the main scanning direction size is aligned to the reference size by rotating the document image as necessary, and performing enlargement/reduction as necessary, and the document image is printed on a selected printing sheet (step S121).

The foregoing is a flow of a copy job in which stapling is set as a specific example of processing according to the embodiment 4 illustrated in FIGS. 12 and 13.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image forming apparatus comprising:
a document reader that reads a plurality of documents having different sizes in a main scanning direction;
a document size detector that detects a main scanning direction size and a sub-scanning direction size of each document;
an image processor that performs image processing on an image of the read document;
a printer that prints, on a printing sheet of a fixed size, the image that has or has not undergone the image processing;
one or more post-processors that perform post-processing on a plurality of printing sheets having a same main scanning direction size according to a user setting; and
one or more controllers that control reading of the document, the image processing, the printing, and the post-processing, wherein
in a case where the post-processing is set, and when the main scanning direction size is alignable to a main scanning direction size of one of the documents by applying, to an image of each document, at least one of image processing among rotation in the unit of 90 degrees, enlargement/reduction, and margin increase/decrease adjustment, the one or more controllers allow to perform the post-processing by aligning the main scanning direction size of each image with respect to the alignable size as a reference size.

2. The image forming apparatus according to claim 1, wherein
in a case where it is determined that a main scanning direction size cannot be aligned to the reference size only by rotating a size of each document detected by the document size detector, but can be aligned by adding a margin, the one or more controllers perform image processing of adding a margin to an image of a necessary document without performing enlargement/reduction.

3. The image forming apparatus according to claim 1, wherein
after the one or more controllers cause the document reader to read an image of each document, and cause the document size detector to detect a size of each document, the one or more controllers determine the reference size in such a way that the number of documents to which enlargement/reduction is applied is minimized.

4. The image forming apparatus according to claim 1, further comprising
a character recognizer that determines whether a character is included in an image of each document, wherein
the one or more controllers determine the reference size in such a way that a margin is added without performing enlargement/reduction for a document in which a character is included in the image, and that a main scanning direction size is aligned by performing enlargement/reduction for a document in which no character is included in the image.

5. The image forming apparatus according to claim 1, wherein
in a case where the post-processing is set, the one or more controllers receive selection by a user as to whether to give priority to post-processing and apply image processing as necessary when documents having different sizes in a main scanning direction are detected, or to cancel settings on post-processing and give priority to printing based on each document or on printing settings set by the user.

6. An image forming method comprising,
by one or more controllers of an image forming apparatus:
reading an image of a plurality of documents having different sizes in a main scanning direction;
detecting a main scanning direction size and a sub-scanning direction size of each document;
performing image processing on the read documents;
printing, on a printing sheet, the image that has or has not undergone the image processing; and
performing post-processing on a plurality of printing sheets having a same main scanning direction size according to a user setting, wherein
performing the image processing includes, in a case where the post-processing is set, and when the main scanning direction size is alignable to a main scanning direction size of one of the documents by applying, to an image of the document, at least one of image processing among rotation in the unit of 90 degrees, enlargement/reduction, and margin increase/decrease adjustment, allowing to perform the post-processing by aligning the main scanning direction size of each image with respect to the alignable size as a reference size.

* * * * *